United States Patent
Huang et al.

(10) Patent No.: US 7,125,153 B2
(45) Date of Patent: Oct. 24, 2006

(54) SHEET-LIKE LIGHT SOURCE DEVICE

(75) Inventors: Tzu-Fong Huang, Gueishan Township, Taoyuan County (TW); Chun-Chieh Chu, Gueishan Township, Taoyuan County (TW)

(73) Assignee: Quanta Display, Inc., Tao Yuan Shien (TW)

( * ) Notice: Subject to any disclaimer, the term of this patent is extended or adjusted under 35 U.S.C. 154(b) by 0 days.

(21) Appl. No.: 11/225,032

(22) Filed: Sep. 14, 2005

(65) Prior Publication Data

US 2006/0126357 A1 Jun. 15, 2006

(30) Foreign Application Priority Data

Dec. 10, 2004 (TW) ............................... 93138394 A

(51) Int. Cl.
*G03B 15/02* (2006.01)
*F21V 13/00* (2006.01)

(52) U.S. Cl. ...................... 362/611; 362/615; 362/633
(58) Field of Classification Search .............. 362/611, 362/606, 607, 609, 618, 620, 615, 633, 632, 362/638, 616; 349/58

See application file for complete search history.

(56) References Cited

U.S. PATENT DOCUMENTS

| 5,988,827 | A |   | 11/1999 | Lee |
|---|---|---|---|---|
| 6,055,029 | A | * | 4/2000 | Kurihara et al. ............... 349/65 |
| 6,561,664 | B1 |   | 5/2003 | Yachi et al. |
| 6,806,921 | B1 | * | 10/2004 | Nishida et al. ............... 349/65 |
| 2003/0201702 | A1 | * | 10/2003 | Kim et al. .................. 313/110 |

* cited by examiner

*Primary Examiner*—Renee Luebke
*Assistant Examiner*—Evan Dzierzynski
(74) *Attorney, Agent, or Firm*—Bacon & Thomas PLLC

(57) ABSTRACT

The present invention relates to a sheet-like light source device, including a light-conducting plate having at least one convex portion disposed on the lateral portion thereof; at least one light-source unit disposed on one side of the light-conducting plate, which includes a light source and a reflecting sheet; and a housing having a chassis and at least one frame; in which the frame is mounted on the edges of the chassis, and a concave portion corresponding to the convex portion of the light-conducting plate to hold the convex portion and a plurality of light-guiding mechanisms are formed on the frame. The present invention further has a housing for a sheet-like light source device, including a chassis and a frame mounted on the edges of the chassis, in which a concave portion and a plurality of light-guiding mechanisms are formed on the frame.

12 Claims, 6 Drawing Sheets

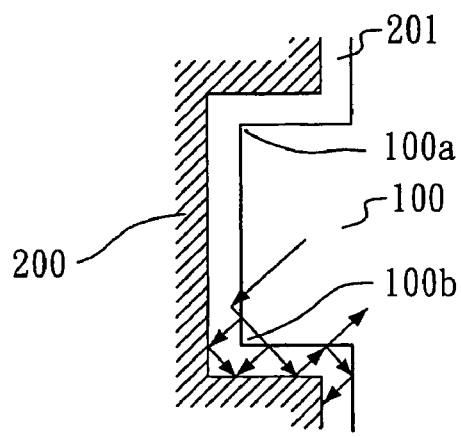
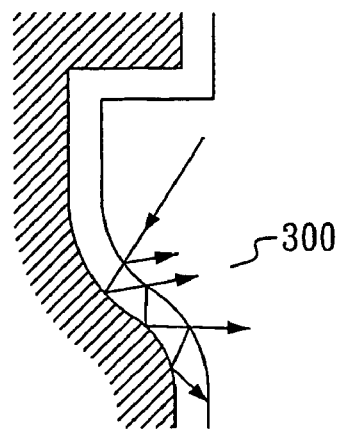
Fig. 1(PRIOR ART)　　Fig. 2(PRIOR ART)
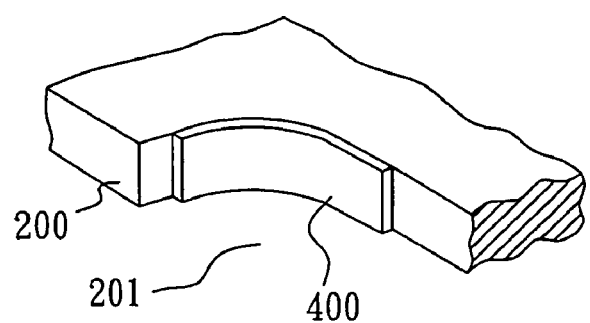
Fig. 3(PRIOR ART)

SHEET-LIKE LIGHT SOURCE DEVICE

BACKGROUND OF THE INVENTION

1. Field of the Invention

The present invention relates to a sheet-like light source device; in particular, a sheet-like light source device for liquid crystal display devices.

2. Description of Related Art

In recent years, the flat panel display industry has rapidly developed. To improve the performance of the displays, the industry has devoted significant efforts to improve and design the structure of the respective components of the display devices, among which the sheet-like light source device of the liquid crystal displays has been improved to provide a light source with a highly uniform luminance distribution of light.

Because the liquid crystal itself is not luminous, it is necessary to add a backlight source (generally, a fluorescent tube) to the rear of a liquid crystal display panel to project light through the display panel. To this end, the light emitting from the light source passes through a polarizer and the liquid crystal in sequence, thereby the arrangement of liquid crystal molecules of the liquid crystal display is changed by voltage. Accordingly, the angle of the light passing through the liquid crystal is altered, resulting in a non-uniform luminance distribution of light on the liquid crystal panel.

In general, the sheet-like light source device is categorized into an edge-light type and a bottom-light type, depending on the position where the sheet-like light source device is disposed. The edge-light type sheet-like light source device is generally used in the small-and-medium displays such as notebook PC displays, PDA displays and cell phone displays. A key component of the edge-light type sheet-like light source device is the light-conducting plate which is provided primarily for directing light from the edge to the visual line. In other words, the light projected from in the edge is uniformly directed to and distributed on the whole light-conducting plate where the visual line is attainable.

A conventional sheet-like light source device has a housing (frame) for holding a light-source unit, a light-conducting plate and a print circuit board. The light-conducting plate is embedded in the center of the housing while the light source is disposed on a lateral side of the housing. A space remains between the light source and the light-conducting plate to facilitate transmission and reflection of light. To prevent the lamp (or the CCFL) within the sheet-like light source device from being cracked by the impacts caused by the motion of the light-conducting plate, a rectangular convex portion 100 is provided with the light-conducting plate, and also, a rectangular concave portion 201 corresponding to the rectangular convex portion 100 is disposed on a housing 200, as shown in FIG. 1. Thus, the light-conducting plate is embedded and fixedly disposed. However, it has been found that light from the light source always concentrates in the right-angled position 100a or 100b of the rectangle when light projects to this light-conducting plate. The concentration phenomenon generates because the light is partially reflected and partially transmitted to the frame when light reaches the convex portion of the light-conducting plate. In addition, the light transmitted to the housing is reflected back to the lateral portion of the light-conducting plate, and the leaking light is repeatedly reflected between the housing and the light-conducting plate. As such, light is concentrated in the position where the convex portion is disposed.

To solve this drawback, U.S. Pat. No. 5,988,827 disclosed a method for changing the folded angle of a convex portion of a plastic frame (or retention member) in a sheet-like light source device so as to improve the reflection of light. As shown in FIG. 2, the right-angled portion is changed to become a rounded portion to disperse the light reflected to the convex portion. However, not only the angle of the light-conducting plate need to be changed, the concave portion of the frame (or retention member) has to be rounded to match the change of the angle of the convex portion 300. The change illustrated above in fact wastes time in manufacturing process and is not suitable for mass production.

U.S. Pat. No. 6,561,664 disclosed another method, in which a black tape 400 is adhered to a concave portion 201 of a frame 200, as shown in FIG. 3. Thus, most of the leaking light reflected directly from the position where the convex portion of a light-conducting plate is disposed can be absorbed. Even so, the black tape is easy to fall off, thereby impairing the engineering reliability.

Therefore, it is desirable to provide an improved sheet-like light source device to mitigate the aforementioned problems.

SUMMARY OF THE INVENTION

To improve the sheet-like light source device, the present invention provides a plurality of light-guiding mechanisms which includes a frame of an edge-light type sheet-like light source device having a convex portion and a concave portion so as to solve light scattering problem caused by the folded angle of the convex portion and the concave portion, and to disperse light transmitting from a side surface of the folded convex portion of the light-conducting plate. In this connection, light will not be reflected again by the frame and enters the light-conducting plate, thus the concentration of light at the corners can be avoided. In addition, after leaking light is dispersed from the sheet-like light source device by means of the light-guiding mechanisms of the present invention, light will not be reflected back to the module along the original path. Hence, the light concentration at the corners can be significantly reduced.

Accordingly, the present invention provides a sheet-like light source device, comprising a light-conducting plate having at least one convex portion disposed on the lateral portion thereof; at least one light-source unit disposed on one side of the light-conducting plate, including a light source and a reflecting sheet; and a housing for holding the light-source unit and the light-conducting plate, having a chassis and at least one frame; in which the frame is mounted on the edges of the chassis, and a concave portion corresponding to the convex portion of the light-conducting plate to receive the convex portion and a plurality of light-guiding mechanisms are formed on the frame.

The present invention further comprises a housing for a sheet-like light source device, including a chassis and a frame mounted on the edges of the chassis, in which at least one concave portion and a plurality of light-guiding mechanisms are formed on the frame.

The light-guiding mechanisms according to the present invention are formed on the frame of the housing. For instance, many light-guide slots are formed along the frame. Preferably, the light-guiding mechanisms are disposed in the concave portion of the frame of the housing. The light-guiding mechanisms according to the present invention are constructed without particular limitation, but preferably are light-guide slots or light guide holes disposed on the frame along the direction at which light is dispersed. The contour of the slots according to the present invention is not specifically defined; but preferably is a single slot, a branch slot, a curved slot or a saw-tooth slot either perpendicular or non-perpendicular to the frame to prevent light from being reflected back to the module. Also, it is preferable to have a dark colored coating over the surface of the frame according to the present invention to increase the light absorbing effect of the frame. More preferably, a black frame is used.

It is preferable to further include a plurality of optical films disposed on one side of the frame, other than on the line formed by the light-source unit and the light-conducting plate, in the sheet-like light source device or the housing according to the present invention so as to homogenize the light. More preferably, the optical films are diffusing sheets, prism sheets or reflecting sheets. The housing of the sheet-like light source device according to the present invention can be made of any material, preferably plastics or metal. Moreover, the slot of the sheet-like light source device of the present invention can be in any shape. Preferably, the slots are contoured as a single slot, a branch slot, a curved slot or a saw-tooth slot.

The position and the quantity of the light-guiding mechanisms according to the present invention are disposed in accordance with the amount of dispersed light. It should be noted that an excessive disposition of the light-guiding mechanisms will render light designed to be reflected to the light-conducting plate insufficient, causing a problem of insufficient luminance on the panel.

The present invention further provides a liquid crystal display device module, comprising a liquid crystal display panel which includes a top substrate, a bottom substrate, and a liquid crystal layer sealed between the top substrate and bottom substrates; and a sheet-like light source device mounted on one side of the top substrate and the bottom substrates, having at least one light-source unit, a polygonal light-conducting plate disposed on one side of the light-source unit, and a housing including a chassis and at least one frame; in which the polygonal light-conducting plate is held in the at least one frame of the housing.

Other objects, advantages, and novel features of the invention will become more apparent from the following detailed description when taken in conjunction with the accompanying drawings.

BRIEF DESCRIPTION OF THE DRAWINGS

FIG. 1 is a schematic diagram of a prior art structure.

FIG. 2 is a schematic diagram of another prior art structure.

FIG. 3 is a schematic diagram of a further prior art structure.

DETAILED DESCRIPTION OF THE PREFERRED EMBODIMENT

Figure 4:
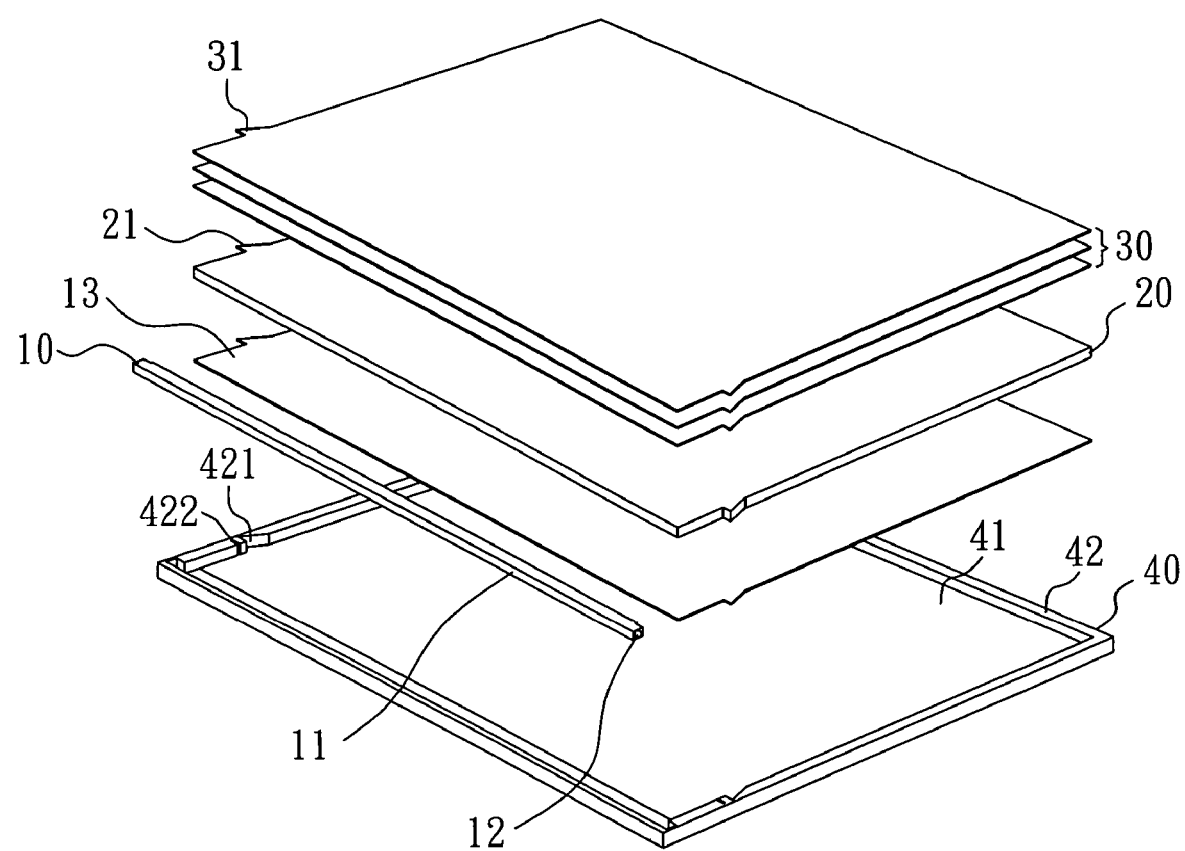
FIG. 4 is a schematic diagram of a sheet-like light source device according to the present invention.

Referring to FIG. 4, a sheet-like light source device of the present invention comprises a light-source unit 10, a light-conducting plate 20, a plurality of optical films 30 and a housing 40. The light-source unit 10 is constituted by a light source 12 and a reflecting sheet 11. Light emitted from the light source 12 is reflected to the light-conducting plate 20 by means of the reflecting sheet 11 and a reflecting plate 13. The light-conducting plate 20 and the optical films 30 are capable of harmonizing or homogenizing the light supplied from the light-source unit 10 so as to provide a uniform luminance distribution of light on a liquid display panel. The optical films 30 may include diffusing sheets, prism sheets or reflecting sheets, for example. The light-conducting plate 20 has convex portions 21, 31 disposed on a stacked manner on the opposing sides thereof, respectively, and also, the opposing sides of the light-conducting plate 20 are perpendicular to the optical films 30 and the light-source unit 10, respectively.

The housing 40 is constituted by a chassis 41 and a frame (i.e. a retention member) 42, and is used for holding the light-source unit 10, the light-conducting plate 20 and the optical films 30. The frame (or the retention member) 42 is mounted on the edges of the chassis 41, having a concave portion 421 for holding the convex portions 21, 31.

A number of embodiments of the light-guiding mechanisms mounted on the frame (or the retention member) 42 or the concave portion 421 according to the present invention now will be described with reference to the drawings of an enlarged structure.

Embodiment 1

Figure 5:
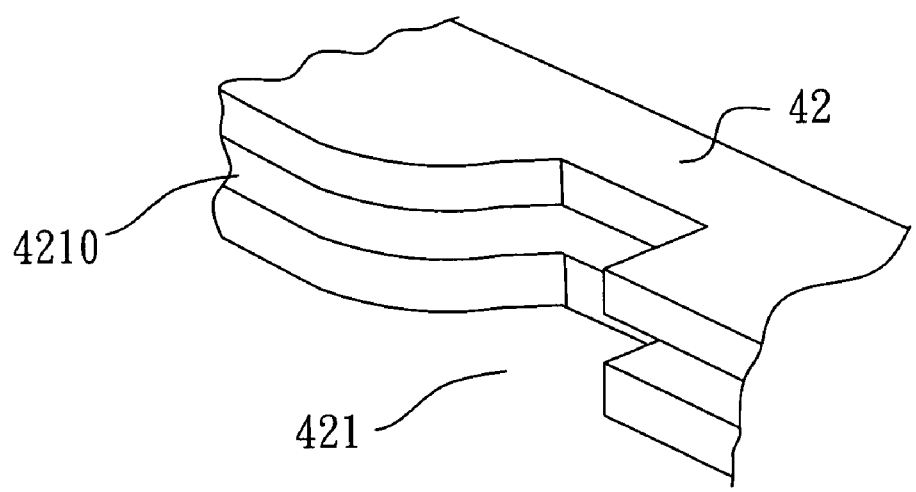
FIG. 5 is a schematic diagram of light-guiding mechanisms according to a first embodiment of the present invention.

Referring to FIG. 5, the light-guiding mechanisms are slots 4210 disposed on the frame (or the retention member) 42, the slots 4210 being open along the frame (or the retention member) 42. When light scattered from the reflecting plate, for instance, from the left side, reaches a position of the concave portion 421 or the frame (or the retention member) 42, the light will be dispersed along the slots 4210 without being again reflected back to the reflecting plate. Thus, the light concentration at the convex portion of the reflecting plate can be reduced.

Embodiment 2

Figure 6:
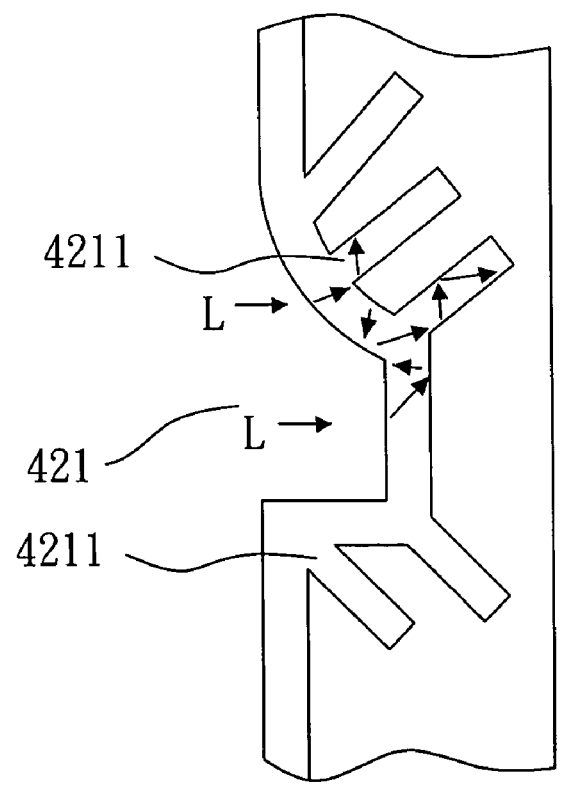
FIG. 6 is a schematic diagram of light-guiding mechanisms according to a second embodiment of the present invention.

Referring to FIG. 6, the light-guiding mechanisms are slots 4211 disposed at a position near the concave portion 421 of the frame (or the retention member), the position of the slots 4211 being selected for facilitating light to be easily reflected to the reflecting plate and open in the frame (or the retention member) 42 to be perpendicular or non-perpendicular to the frame (or the retention member). When light scattered from the reflecting plate, for instance, from the left side, reaches a position of the concave portion 421 or the frame (or the retention member) 42, the light will be dispersed along the slots 4211 without being again reflected back to the reflecting plate.

Embodiment 3

Figure 7:
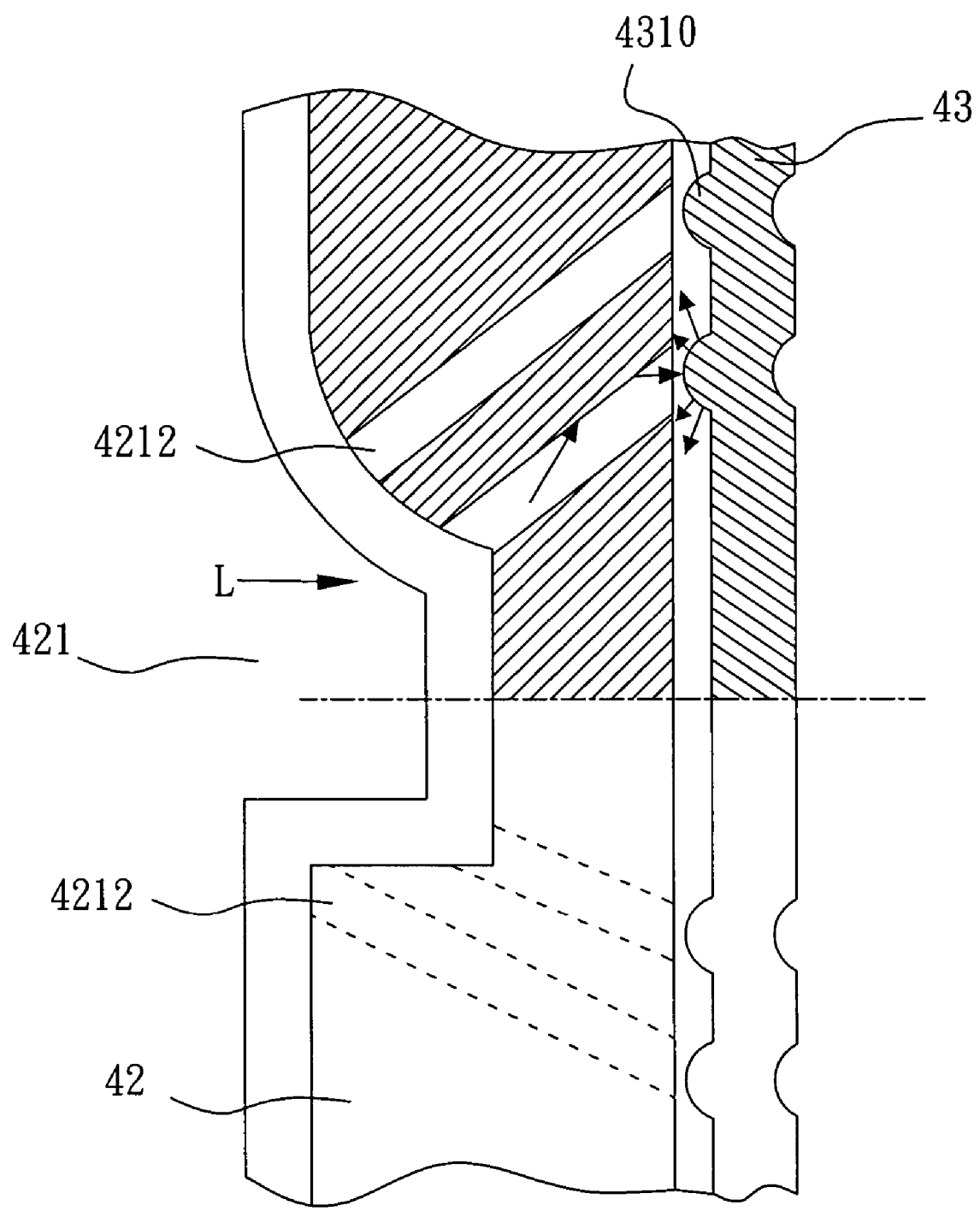
FIG. 7 is a schematic diagram of light-guiding mechanisms according to a third embodiment of the present invention.

Referring to FIG. 7, the light-guiding mechanisms are mounted not only on the frame (or the retention member) of the sheet-like light source device but also on an outer support 43 for holding the frame (or the retention member) 42 in this embodiment. The upper part of FIG. 7 as divided with dotted lines is a cross-sectional view of the light-guiding mechanisms disposed in the frame (or the retention member) while the lower part of FIG. 7 as divided with dotted lines is a top view of the light-guiding mechanisms.

The light-guiding mechanisms are slots 4212 disposed at a position near the concave portion 421 of the frame (or the retention member), the position of the slots 4212 being selected for facilitating light to be easily reflected back to the reflecting plate and open in the frame (or the retention member) 42 in a penetrated manner to be perpendicular or non-perpendicular to the frame (or the retention member). When light scattered from the reflecting plate, for instance, from the left side, reaches a position of the concave portion 421 or the frame (or the retention member) 42, the light will be dispersed along the slots 4212 until the light is transmitted to the outer support 43. In addition, a protruding block 4310 is disposed at the position where the outer support 43 contacts with the end of the slots 4212 to prevent light from being reflected back from the surface of the outer support 43 along the original path. Thus, light is dispersed, and will not be reflected again.

Embodiment 4

Figure 8:
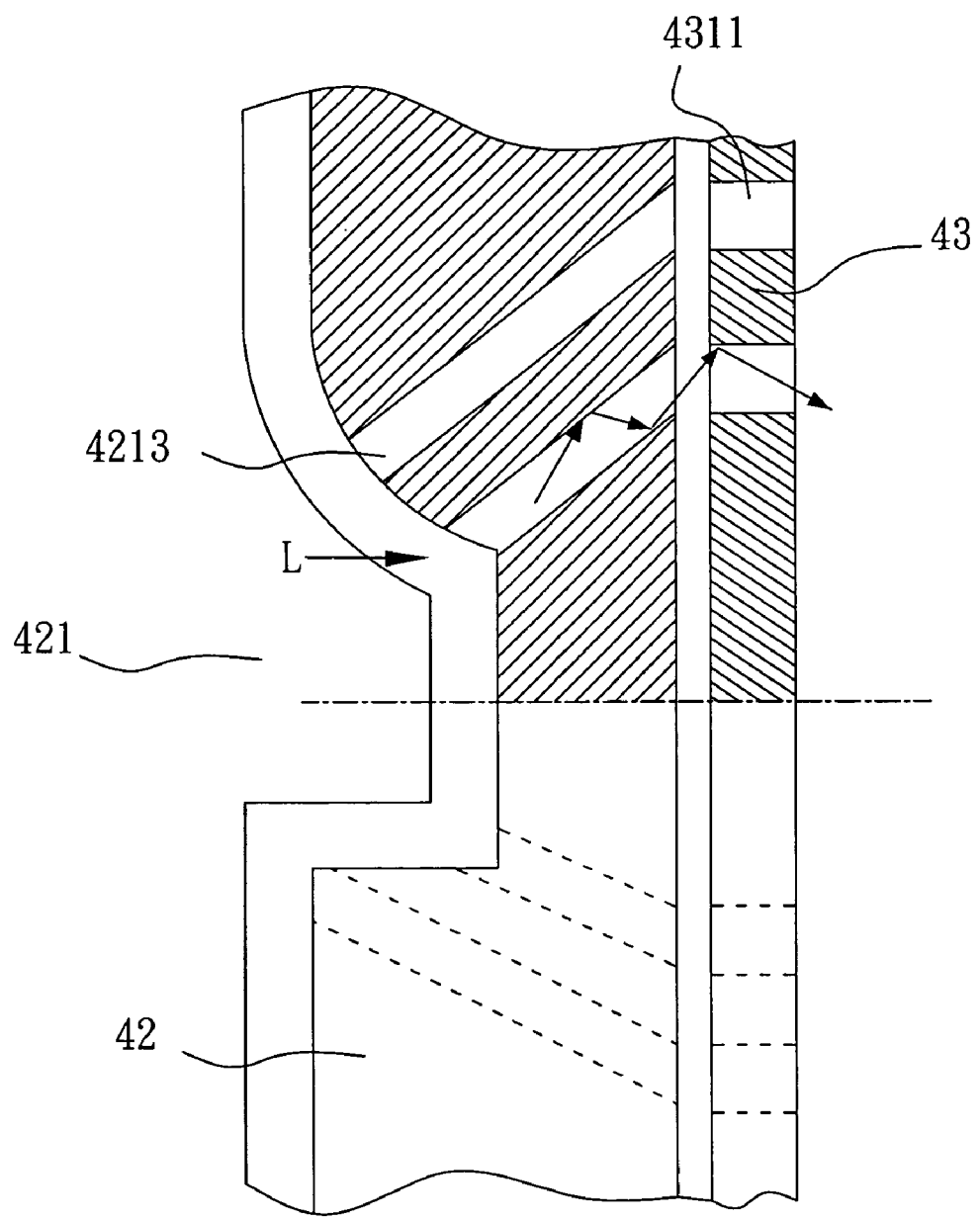
FIG. 8 is a schematic diagram of light-guiding mechanisms according to a fourth embodiment of the present invention.

Referring to FIG. 8, this embodiment is constructed similar to embodiment 3. The light-guiding mechanisms are also disposed on the outer support 43 for holding the frame (or the retention member) 42. The upper part of FIG. 8 as divided with dotted lines is a cross-sectional view of the light-guiding mechanisms mounted in the frame (or the retention member) 42 while the lower part of FIG. 8 as divided with dotted lines is a top view of the light-guiding mechanisms.

In this embodiment, the light-guiding mechanisms are slots 4213 disposed at a position near the concave portion 421 of the frame (or the retention member), the position of the slots 4213 being selected for facilitating light to be easily reflected to the reflecting plate and open in the frame (or the retention member) 42 in a penetrated manner to be perpendicular or non-perpendicular to the frame (or the retention member). When light scattered from the reflecting plate, for instance, from the left side, reaches a position of the concave portion 421 or the frame (or the retention member) 42, the light will be dispersed along the slots 4213 until the light is transmitted to the outer support 43. In addition, through holes 4311 are disposed at the position where the outer support 43 contacts with the end of the slot 4213 to prevent light from being reflected back from the surface of the outer support 43 along the original path. Thus, light is dispersed out of the module to avoid reflection of light.

Embodiment 5

Figure 9:
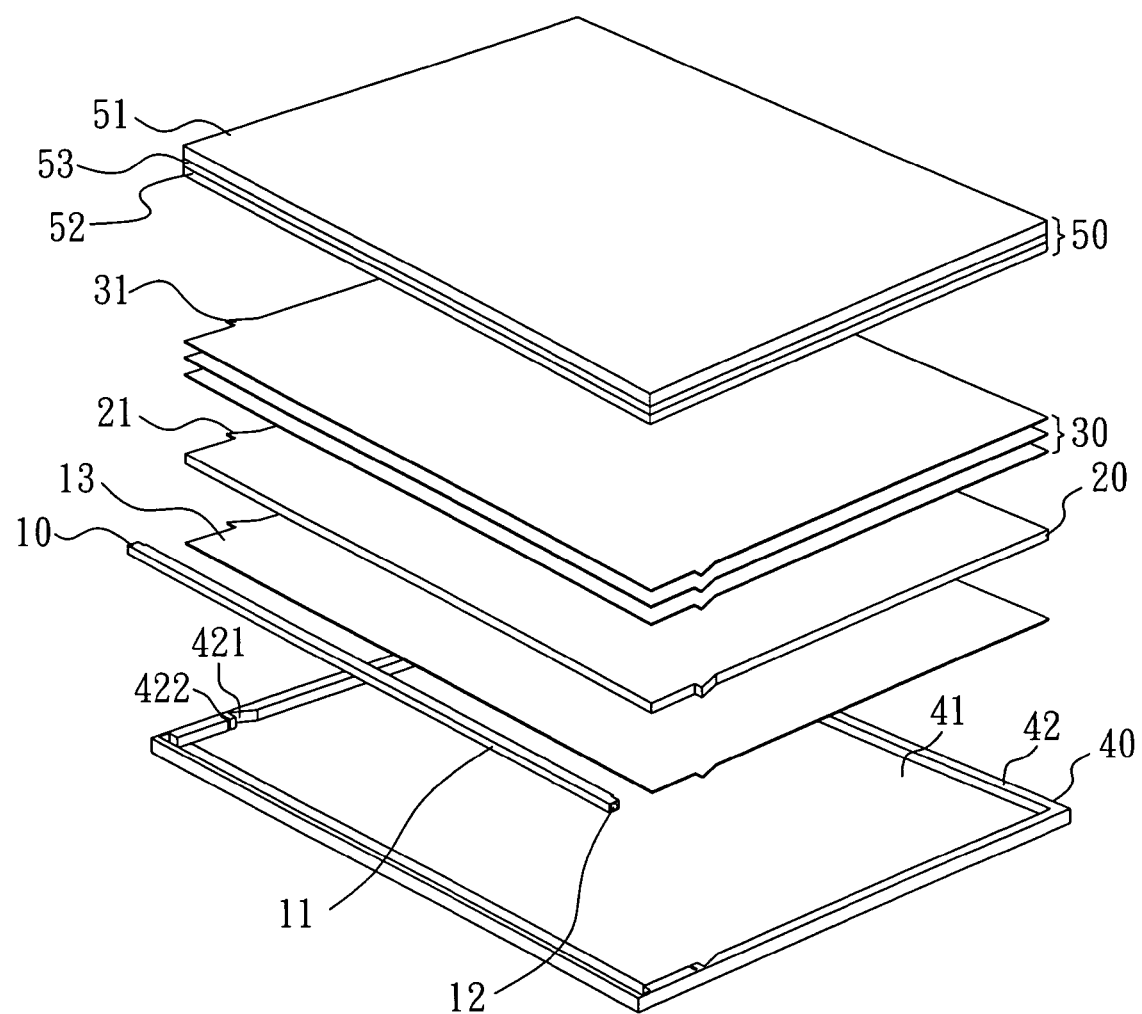
FIG. 9 is a schematic diagram of a liquid crystal display device module according to a fifth embodiment of the present invention.

Referring to FIG. 9, in which a liquid crystal display device module of the present invention is schematically illustrated, a liquid crystal display panel 50 comprises a top substrate 51, a bottom substrate 52 and a liquid crystal layer 53 disposed between the top substrate 51 and the bottom substrate 52.

In this liquid crystal display device module, a sheet-like light source device comprises a light-source unit 10, a light-conducting plate 20, a plurality of optical films 30 and a housing 40. The light-source unit 10 is constituted by a light source 12 and a reflecting sheet 11. Light emitting from the light source 12 is reflected to the light-conducting plate 20 by means of the reflecting sheet 11 and a reflecting plate 13. The light-conducting plate 20 and the optical films 30 are capable of harmonizing or homogenizing light supplied from the light-source unit 10 so as to provide a uniform luminance distribution of light on a liquid display panel. The optical films 30 may include diffusing sheets, prism sheets or reflecting sheets, for example. The light-conducting plate 20 has convex portions 21, 31 disposed in a stacked manner on the opposing sides thereof, respectively, and also, the opposing sides of the light-conducting plate 20 are perpendicular to the optical films 30 and the light-source unit 10, respectively. The housing 40 is constituted by a chassis 41 and a frame (or a retention member) 42, and is used for holding the light-source unit 10, the light-conducting plate 20 and the optical films 30. The frame (or the retention member) 42 is mounted on the edges of the chassis 41 and has a concave portion 421 for holding the convex portions 21, 31.

Although the present invention has been explained in relation to its preferred embodiments, it is to be understood that many other possible modifications and variations can be made without departing from the spirit and scope of the invention as hereinafter claimed.

What is claimed is:

1. A sheet-like light source device, comprising:
   a light-conducting plate having at least one convex portion disposed on one lateral portion thereof; and
   at least one light-source unit disposed on one side of said light-conducting plate, comprising a light source and a reflecting sheet;
   a housing for holding said light-source unit and said light-conducting plate, having a chassis and at least one frame;
   wherein said frame is mounted on the edges of said chassis, and includes a concave portion corresponding to said convex portion of said light-conducting plate for holding said convex portion, and a plurality of light-guiding mechanisms are formed on said frame, and the light-guiding mechanisms are light-guide slots or light-guide holes.

2. The sheet-like light source device of claim 1, wherein said light-guiding mechanisms are disposed in said concave portion of said frame of said housing.

3. The sheet-like light source device of claim 1, wherein said slots are formed as a single slot, a branch slot, a curved slot or a saw-tooth slot.

4. The sheet-like light source device of claim 1, wherein said frame is a black colored frame.

5. The sheet-like light source device of claim 1, further comprising a plurality of optical films disposed on one side of said frame, other than on the line formed by said light-source unit and said light-conducting plate, so as to homogenize the light.

6. The sheet-like light source device of claim 5, wherein said optical films are diffusing sheets, prism sheets or reflecting sheets.

7. The sheet-like light source device of claim 1, wherein said housing is made of plastics or metal.

8. A housing for a sheet-like light source device, comprising:
a chassis; and
a frame mounted on the edges of said chassis;
wherein at least one concave portion and a plurality of light-guiding mechanisms are formed on said frame, and the light-guiding mechanisms are light-guide slots or light-guide holes.

9. The housing of claim 8, wherein said light-guiding mechanisms are disposed in said concave portion.

10. The housing of claim 8, wherein said slots are formed as a single slot, a branch slot, a curved slot or a saw-tooth slot.

11. The housing of claim 8, wherein said frame is a black colored frame.

12. The housing of claim 8, wherein said housing is made of plastics or metal.

* * * * *